United States Patent
Allemann

(10) Patent No.: US 8,601,574 B2
(45) Date of Patent: Dec. 3, 2013

(54) ANTI-PHISHING METHODS BASED ON AN AGGREGATE CHARACTERISTIC OF COMPUTER SYSTEM LOGINS

(75) Inventor: Andrew Whittier Allemann, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1715 days.

(21) Appl. No.: 11/093,181

(22) Filed: Mar. 29, 2005

(65) Prior Publication Data

US 2006/0224511 A1 Oct. 5, 2006

(51) Int. Cl.
*G06F 11/00* (2006.01)

(52) U.S. Cl.
USPC ........ 726/22; 726/2; 726/23; 726/24; 726/25; 713/185; 709/224; 709/229

(58) Field of Classification Search
USPC .......... 713/1, 2, 188, 194, 185; 380/200, 201, 380/255, 277; 726/2, 22–25; 709/224, 229
See application file for complete search history.

(56) References Cited

U.S. PATENT DOCUMENTS

| | | | |
|---|---|---|---|
| 6,405,318 B1 * | 6/2002 | Rowland | 726/22 |
| 6,484,203 B1 * | 11/2002 | Porras et al. | 709/224 |
| 6,871,195 B2 * | 3/2005 | Ryan et al. | 706/46 |
| 7,373,524 B2 * | 5/2008 | Motsinger et al. | 713/194 |
| 2002/0016736 A1 * | 2/2002 | Cannon et al. | 705/14 |
| 2002/0111907 A1 * | 8/2002 | Ling | 705/41 |
| 2003/0212903 A1 * | 11/2003 | Porras et al. | 713/200 |
| 2003/0229706 A1 * | 12/2003 | Park | 709/229 |
| 2004/0042470 A1 * | 3/2004 | Cooper et al. | 370/401 |
| 2004/0193943 A1 * | 9/2004 | Angelino et al. | 714/4 |
| 2005/0039057 A1 * | 2/2005 | Bagga et al. | 713/202 |
| 2005/0114679 A1 * | 5/2005 | Bagga et al. | 713/184 |
| 2005/0187934 A1 * | 8/2005 | Motsinger et al. | 707/9 |
| 2006/0070126 A1 * | 3/2006 | Grynberg | 726/22 |

* cited by examiner

*Primary Examiner* — Saleh Najjar
*Assistant Examiner* — Joseph Pan
(74) *Attorney, Agent, or Firm* — Toler Law Group, PC

(57) ABSTRACT

An anti-phishing method comprises monitoring a plurality of logins into a computer system over a period of time, and generating a phishing alert signal based on an aggregate characteristic of the plurality of logins.

18 Claims, 2 Drawing Sheets

ANTI-PHISHING METHODS BASED ON AN AGGREGATE CHARACTERISTIC OF COMPUTER SYSTEM LOGINS

FIELD OF THE DISCLOSURE

The present disclosure relates to methods and systems for detecting phishing.

BACKGROUND

Phishing is a term used to describe deceptive practices on the Internet to gain personal information such as social security numbers and credit card numbers. A typical phishing attack involves sending a spoof e-mail to a recipient. The spoof e-mail is made to look like an official e-mail from a trusted company. The spoof e-mail may state that the recipient needs to verify some personal information. The spoof e-mail may ask the recipient to enter the personal information in the e-mail and click a submit button, or to go to a computer site made to look like the trusted company's site and enter the personal information.

Companies have attempted to mitigate phishing attacks by notifying their customers that they will never ask for personal information in an e-mail. Toolbars have been created for use inside Web browsers to indicate if someone has visited a spoofed Web site. These toolbars are limited to Web sites owned by the toolbar creator such as eBay® and PayPal®.

Business activity monitoring is a set of tools that monitor certain transactions processed by a computer system and create alerts based thereon. For example, a business activity monitoring system may alert a company official if order volume being sent through the company's computer system falls below a particular threshold. This alert potentially indicates a malfunction of the company's computer system.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE DRAWINGS

Figure 1:
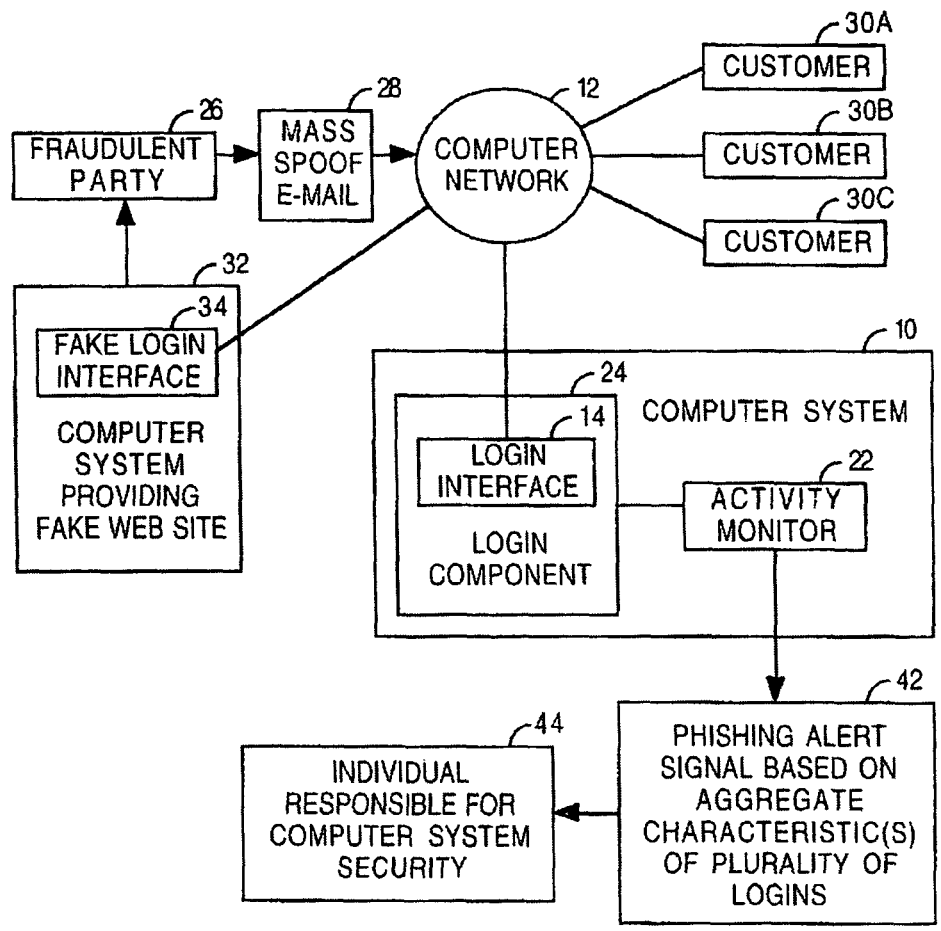
FIG. 1 is a block diagram of an embodiment of an anti-phishing system.
Figure 2:
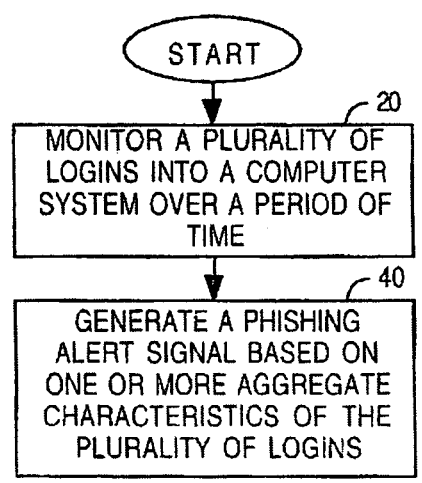
FIG. 2 is a flow chart of an embodiment of an anti-phishing method.

Disclosed herein are embodiments of a method and system that use business activity monitoring to give an early warning of a potential phishing attack on a computer system. Embodiments of the present invention are described with reference to FIG. 1, which is a block diagram of an embodiment of an anti-phishing system, and FIG. 2, which is a flow chart of an embodiment of an anti-phishing method.

The anti-phishing method and system are used to monitor use of a computer system 10. The computer system 10 is accessible over a computer network 12 such as the Internet. The computer system 10 provides a login interface 14 that allows a plurality of different users to login. The login interface 14 may require each user to enter an identifier (e.g. a name or an account number) and/or a password in order to access various features provided by the computer system 10. Examples of the features provided by the computer system 10 to a successfully logged-in customer include, but are not limited to: (a) facilitating online purchases for the customer; (b) providing the customer's personal information including customer financial information (e.g. a customer's bank account number, a customer's credit card number, record(s) of the customer's financial transactions) and/or customer identification information (e.g. a customer's mailing address, a customer's telephone number, a customer's social security number); (c) performing electronic account management acts (e.g. paying a bill online, reviewing a balance due, and changing customer information); and (d) processing requests to change the customer's password. The anti-phishing method and system can be used in a variety of applications, including but not limited to monitoring suspicious behavior on a telecommunication provider's electronic billing Web site provided by the computer system 10.

As indicated by block 20, the method comprises monitoring a plurality of logins into the computer system 10 over a period of time. This act is performed by a business activity monitor 22 that cooperates with a login component 24 that provides the login interface 14.

For purposes of illustration and example, consider a fraudulent party 26 that sends mass e-mail messages 28 to customers 30 of a business such as a telecom provider. The e-mail messages 28 are made to appear as being composed and sent by the telecom provider. The e-mail messages 28 tell the customers 30 that their information has been compromised and that they must update their credit card information or their phone service will be discontinued.

The e-mail messages 28 may direct the customers 30 to go to a fake computer site 32 that appears to be the actual computer site provided by the computer system 10. The fake computer site 32 provides a fake login interface 34 that appears to be the login interface 14. The fake login interface 34 prompts the customers 30 to enter login information such as their username and password, and to click a submit button. The fraudulent party 26 receives the customers' login information and uses the customers' login information to make multiple logins into the computer system 10. For each account that is logged in, the fraudulent party 26 can use the computer system 10 to make online purchases, view customer personal information, view customer financial information, and change the password.

Alternatively, the e-mail messages 28 may include a form into which the customers 30 are to enter their personal information. The fraudulent party 26 receives the personal information from those customers who reply to the e-mail messages 28. The fraudulent party 26 can use the personal information to commit fraudulent acts including but not limited to identity theft.

Because of their large-scale nature, phishing attacks (which may or may not be the same as the above example) cause a change in the aggregate behavior of the plurality of logins into the computer system 10 over the period of time. As indicated by block 40, the method comprises generating a phishing alert signal 42 based on one or more aggregate characteristics of the plurality of logins. The phishing alert signal 42 may be triggered if any of the various aggregate characteristic(s) has a value that is equal to or beyond an associated threshold value. As used herein, the term "beyond" is meant to describe either a state of being greater than or a state of being less than depending on how the aggregate characteristic is defined.

A first example of an aggregate characteristic is based on a first number of the plurality of logins after which customer personal information is requested from the computer system 10. The first number may indicate, for example, a number of logins after which a user goes directly to a page that includes a customer's financial information and/or customer contact information. The phishing alert signal 42 may be triggered if the first number over a time period is greater than or equal to a first threshold.

The customer personal information may comprise customer financial information such as a customer bank account identifier (e.g. a bank account number) and/or a customer credit card number. Either alternatively or additionally, the customer personal information may include customer contact information such as a customer residence address, a customer mailing address, a customer e-mail address and/or a customer telephone number.

Thus, the first aggregate characteristic triggers the phishing alert signal 42 in the event that an unusual number of customers' financial information is requested over a period of time, which is the case if the fraudulent party 26 is gathering multiple customers' financial information to make fraudulent purchases. Either alternatively or additionally, the first aggregate characteristic triggers the phishing alert signal 42 in the event that an unusual number of customers' contact information is requested over a period of time, which is the case if the fraudulent party 26 is gathering multiple customers' contact information to commit multiple identity thefts and/or to later contact and victimize the customers.

A second example of an aggregate characteristic is based on a spike in a second number of the plurality of logins. The second number may count only particular type(s) of logins, such as those for which a purchase or other type of online order is attempted and/or made. The phishing alert signal 42 may be triggered if a change in the second number over a time period is greater than or equal to a second threshold. Thus, the second aggregate characteristic triggers the phishing alert signal 42 in the event that an unusual spike in the number of logins followed by large online orders occurs, which is the case if the fraudulent party 26 is attempting to run up costs of the victimized customers or ordering merchandise (e.g. telephones) to ship to an address of the fraudulent party 26.

A third example of an aggregate characteristic is based on a third number of the plurality of logins after which a password change is requested. The phishing alert signal 42 may be triggered if the third number over a period of time is greater than or equal to a third threshold. Thus, the third aggregate characteristic triggers the phishing alert signal 42 if an unusual number of password changes are attempted, which is the case if the fraudulent party 26 is attempting to prevent the customers from accessing their accounts on the computer system 10. Customers who are prevented access to their accounts may not immediately discover that their accounts have been compromised by the fraudulent party 26 for purposes of gathering their personal information and/or for making unauthorized purchases.

Any one or more of the above examples of aggregate characteristics may be monitored to trigger the phishing alert signal 42. Further, other examples of aggregate characteristics may be used either in addition to or as an alternative to the above examples.

The phishing alert signal 42 is communicated to an individual 44 responsible for security of the computer system 10. The phishing alert signal 42 can be visually and/or audibly displayed by a display device, or printed as a hard copy.

The individual 44 may be an official of the company whose customers perform transactions using the computer system 10. Based on the phishing alert signal 42, the individual 44 may investigate to determine whether or not an actual phishing attack is taking place, may take action to protect the computer system 10 from a suspected phishing attack, may contact a law enforcement authority, and/or may attempt to identify a source of the suspected phishing attack.

The acts described herein may be performed by a computer processor directed by computer-readable program code stored by a computer-readable medium.

It will be apparent to those skilled in the art that the disclosed embodiments may be modified in numerous ways and may assume many embodiments other than the forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An anti-phishing method comprising:
monitoring, via a processor, actions of a plurality of different users over a period of time; and
generating a single phishing alert signal in response to determining that multiple users of the plurality of different users have performed a first user action during the period of time,
wherein the first user action is indicated when a user logs in and immediately thereafter navigates directly to a first particular web page,
wherein the first user action is not indicated when the user logs in and immediately thereafter navigates directly to a second particular web page that is different than the first particular web page,
wherein the single phishing alert signal is generated only when more than one user of the plurality of different users has performed the first user action during the period of time, and
wherein the single phishing alert signal is not generated when only a single user of the plurality of different users has performed the first user action during the period of time.

2. The anti-phishing method of claim 1, wherein the first particular web page includes customer personal information.

3. The anti-phishing method of claim 2, wherein the customer personal information comprises financial information.

4. The anti-phishing method of claim 3, wherein the financial information comprises a customer bank account identifier.

5. The anti-phishing method of claim 3, wherein the financial information comprises a credit card number.

6. The anti-phishing method of claim 2, wherein the customer personal information comprises contact information.

7. The anti-phishing method of claim 1, wherein the first particular web page enables the user to initiate a password change.

8. The anti-phishing method of claim 1, wherein the actions are performed after logging in to a computer system that provides an electronic billing web site for a telecommunication provider.

9. The anti-phishing method of claim 1, further comprising identifying a source of a suspected phishing attack in response to determining that the multiple users have performed the first user action during the period of time.

10. The anti-phishing method of claim 1, further comprising initiating contact with a law enforcement authority in response to determining that the multiple users have performed the first user action during the period of time.

11. A computer-readable storage device comprising instructions that, when executed by a processor, cause the processor to perform operations comprising:
- monitoring actions of a plurality of different users over a period of time; and
- generating a single phishing alert signal in response to determining that multiple users of the plurality of different users have performed a first user action during the period of time,
- wherein the first user action is indicated when a user logs in and immediately thereafter navigates directly to a first particular web page,
- wherein the first user action is not indicated when the user logs in and immediately thereafter navigates directly to a second particular web page that is different than the first particular web page,
- wherein the single phishing alert signal is generated only when more than one user of the plurality of different users has performed the first user action during the period of time, and
- wherein the single phishing alert signal is not generated when only a single user of the plurality of different users has performed the first user action during the period of time.

12. The computer-readable storage device of claim 11, wherein the first particular web page includes customer personal information.

13. The computer-readable storage device of claim 12, wherein the customer personal information comprises financial information.

14. The computer-readable storage device of claim 13, wherein the financial information comprises a bank account identifier.

15. The computer-readable storage device of claim 13, wherein the financial information comprises a credit card number.

16. The computer-readable storage device of claim 12, wherein the customer personal information comprises contact information.

17. The computer-readable storage device of claim 11, wherein the first particular web page enables the user to initiate a password change.

18. The computer-readable storage device of claim 11, wherein the actions are performed after logging in to a computer system that provides an electronic billing web site for a telecommunication provider.

* * * * *